(12) United States Patent
Minatogawa et al.

(10) Patent No.: US 7,668,457 B2
(45) Date of Patent: Feb. 23, 2010

(54) IMAGE ARCHIVING APPARATUS AND METHOD OF CONTROLLING SAME

(75) Inventors: Hiroshi Minatogawa, Asaka (JP); Yoshiko Shiimori, Asaka (JP); Mika Sugimoto, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 353 days.

(21) Appl. No.: 11/227,110

(22) Filed: Sep. 16, 2005

(65) Prior Publication Data

US 2006/0080719 A1 Apr. 13, 2006

(30) Foreign Application Priority Data

Sep. 24, 2004 (JP) ............................. 2004-276885

(51) Int. Cl.
G03B 17/24 (2006.01)
G03B 17/48 (2006.01)
(52) U.S. Cl. ...................................... 396/429; 396/310
(58) Field of Classification Search .............. 348/207.1, 348/231.99, 231.2, 231.3; 396/56, 57, 429, 396/310; 725/105
See application file for complete search history.

(56) References Cited

U.S. PATENT DOCUMENTS 6,750,902 B1 *  6/2004  Steinberg et al. ......... 348/211.3
2003/0184653 A1 * 10/2003  Ohkubo .................... 348/207.1
2004/0131282 A1 *  7/2004  Yoshida et al. ............. 382/312
2004/0264810 A1 * 12/2004  Taugher et al. ............ 382/305
2005/0036042 A1 *  2/2005  Haas et al. ................ 348/231.3

FOREIGN PATENT DOCUMENTS

| JP | 2000-341614 A | 12/2000 |
| JP | 2003-87873 A | 3/2003 |
| JP | 2004-62216 A | 2/2004 |
| JP | 2004-134943 A | 4/2004 |

* cited by examiner

Primary Examiner—Rodney E Fuller
(74) Attorney, Agent, or Firm—Birch, Stewart, Kolasch & Birch, LLP

(57) ABSTRACT

A image archiving apparatus is connected to a digital still camera and acquires the serial ID and product ID of the camera. The image archiving apparatus reads image files from the camera. If a camera folder corresponding to the connected camera has been generated, the read image files are stored in this folder. If the folder has not been generated, a new folder is generated and the read image files are stored in the generated folder. Image files are organized and stored in a folder that corresponds to the model of the camera that applies the image files to the image archiving apparatus.

9 Claims, 17 Drawing Sheets

IMAGE ARCHIVING APPARATUS AND METHOD OF CONTROLLING SAME

BACKGROUND OF THE INVENTION

1. Field of the Invention

This invention relates to an image archiving apparatus and to method of controlling the same.

2. Description of the Related Art

There are greater opportunities for taking photographs owing to the widespread use of digital still cameras and mobile telephones equipped with a camera. Since photographs can be taken so easily, there has been an enormous increase in the number of image frames obtained through such photography.

An apparatus that uses a television to enjoy images captured by a digital still camera also has been considered. For example, see the specification of Japanese Patent Application Laid-Open No. 2000-341614.

However, even this apparatus does not take the organizing and archiving of images into account. For this reason, the state of the art is such that although large numbers of pictures are taken, they cannot be organized and are merely allowed to accumulate without being given the opportunity to be viewed. In particular, a user who does not possesses a personal computer would find it difficult to organize images.

SUMMARY OF THE INVENTION

Accordingly, an object of the present invention is to enable the organizing and archiving of images.

According to a first aspect of the present invention, the foregoing object is attained by providing an image archiving apparatus comprising: an image data input device for inputting image data supplied from an image data storage device; a discriminating device (discriminating means) for discriminating the model of the image data storage device; and an image data storage device for storing image data, which has been input from the image data input device, group by group, wherein the group is based upon the model that has been discriminated by the discriminating device.

The first aspect of the present invention also provides a control method suited to the image archiving apparatus described above. Specifically, the first aspect of the present invention provides a method of controlling an image archiving apparatus, comprising the steps of: inputting image data supplied from an image data storage device; discriminating the model of the image data storage device; and storing the input image data group by group, wherein the group is based upon the model that has been discriminated.

In accordance with the first aspect of the present invention, the model of an image data storage device that applies image data to an image data archiving apparatus is discriminated. When image data is input, the input image data is stored group by group, the particular group being based upon the model of the image data storage device.

Thus, image data can be grouped and organized for every model of image data storage device.

According to a second aspect of the present invention, the foregoing object is attained by providing an image archiving apparatus comprising: an image data input device for inputting image data supplied from an image data storage device; a photography date detecting device (photography date detecting means) for detecting date of photography of an image represented by image data that has been input to the image data input device; and an image data storage device for storing image data, which has been input to the image data input device, group by group, wherein the group is based upon the date of photography that has been detected by the photography date detecting device.

The second aspect of the present invention also provides a control method suited to the image archiving apparatus described above. Specifically, the second aspect of the present invention provides a method of controlling an image archiving apparatus, comprising the steps of: inputting image data supplied from an image data storage device; detecting date of photography of an image represented by image data that has been input; and storing the input image data group by group, wherein the group is based upon the date of photography that has been detected.

In accordance with the second aspect of the present invention, the date of photography of an image represented by image data that is input to an image archiving apparatus is detected. The input image data is grouped and stored group by group, the particular group being based upon the date of photography detected.

Thus, image data can be grouped and organized for every date of photography that has been input to the image archiving apparatus.

The image archiving apparatus may further comprise a selecting device for selecting one group from among groups into which image data that has been stored in the image data storage device has been divided; and a display control device for controlling an image display device in such a manner that images represented by image data contained in a group that has been selected by the selecting device will be displayed in order.

Thus, images are displayed in order on a per-group basis.

By way of example, the selecting device has an infrared receiving device for receiving a selection command transmitted by infrared communication from a mobile telephone. In this case, the aforementioned one group would be selected based upon the selection command received by the infrared receiving device.

The image archiving apparatus may further comprise: a display control device for controlling an image display device in such a manner that images represented by image data contained in a group will be displayed in the form of an array group by group; a selecting device for selecting images from among images displayed based upon control by the display control device; and a first storage control device for controlling the image data storage device in such a manner that image data representing images selected by the selecting device will be stored as a new group.

The archiving apparatus may further comprise a group name input device for inputting a group name of image data that has been stored by the storage control device; and a second storage control device for controlling the image data storage device in such a manner that data representing a group name that has been input by the group name input device will be stored in association with a new group corresponding to image data stored under the control of the storage control device.

By way of example, the group name input device includes an infrared receiving device for receiving group-name data transmitted from a mobile telephone. In this case, a group name represented by group-name data received by the infrared receiving device would be input.

The image archiving apparatus may further comprise an album page generating device (album page generating means) for generating data representing an album page that contains images represented by image data that has been stored group by group in the image data storage device; a display control device for controlling the image data storage device in such a manner that album page data that has been generated by the album page generating device will be stored at a prescribed address; a receiving device for receiving data representing a request to the above-mentioned address; and an album page data transmitting device for transmitting the album page data, which has been stored in the image data storage device at the above-mentioned address, to the apparatus that is the source of the request, in response to reception of the request data by the receiving device.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

A preferred embodiment of the present invention will now be described in detail with reference to the drawings.

Figure 1:
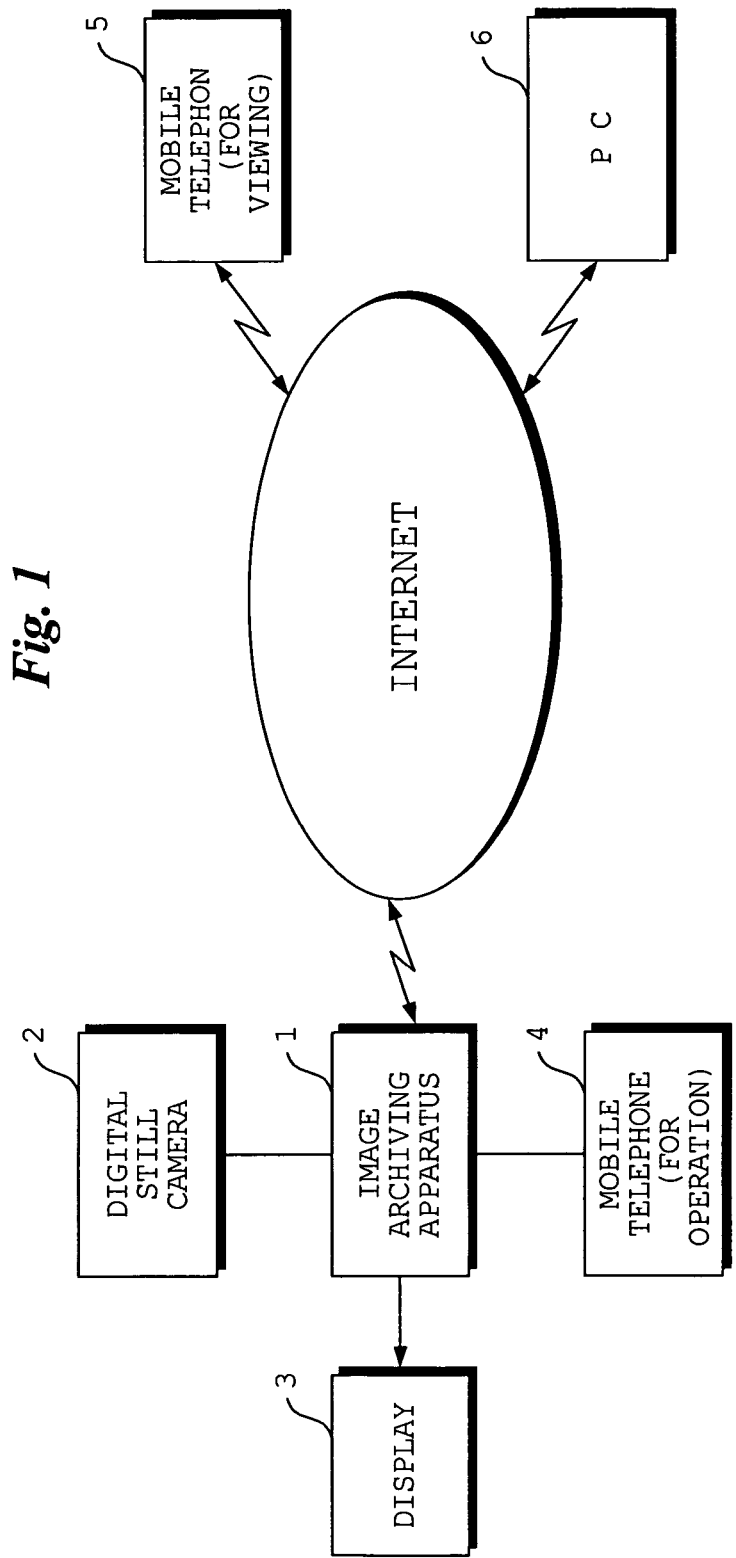
FIG. 1 illustrates an overview of an image viewing system.

FIG. 1 illustrates an overview of an image viewing system according to an embodiment of the present invention.

The image viewing system includes an image archiving apparatus 1. Connected to the image archiving apparatus 1 are a digital still camera 2 that provides the image archiving apparatus 1 with image files, and a display unit 3 for displaying images represented by image files that have been archived (recorded) in the image archiving apparatus 1. Further, the image archiving apparatus 1 is capable of infrared communication with a mobile telephone (a mobile telephone for operating the image archiving apparatus) 4 that operates and commands the image archiving apparatus 1.

Furthermore, the image archiving apparatus 1 is capable of communicating with a mobile telephone (a mobile telephone for viewing images) and a personal computer 6 via the Internet. An image file, etc., is transmitted from the image archiving apparatus 1 to the mobile telephone 5 and personal computer 6 in response to a command from the mobile telephone 5 and personal computer 6. An image represented by an image file that has been archived in the image archiving apparatus 1 is displayed on the display screen of the mobile telephone 5 and on the display screen of the personal computer 6.

Figure 2:
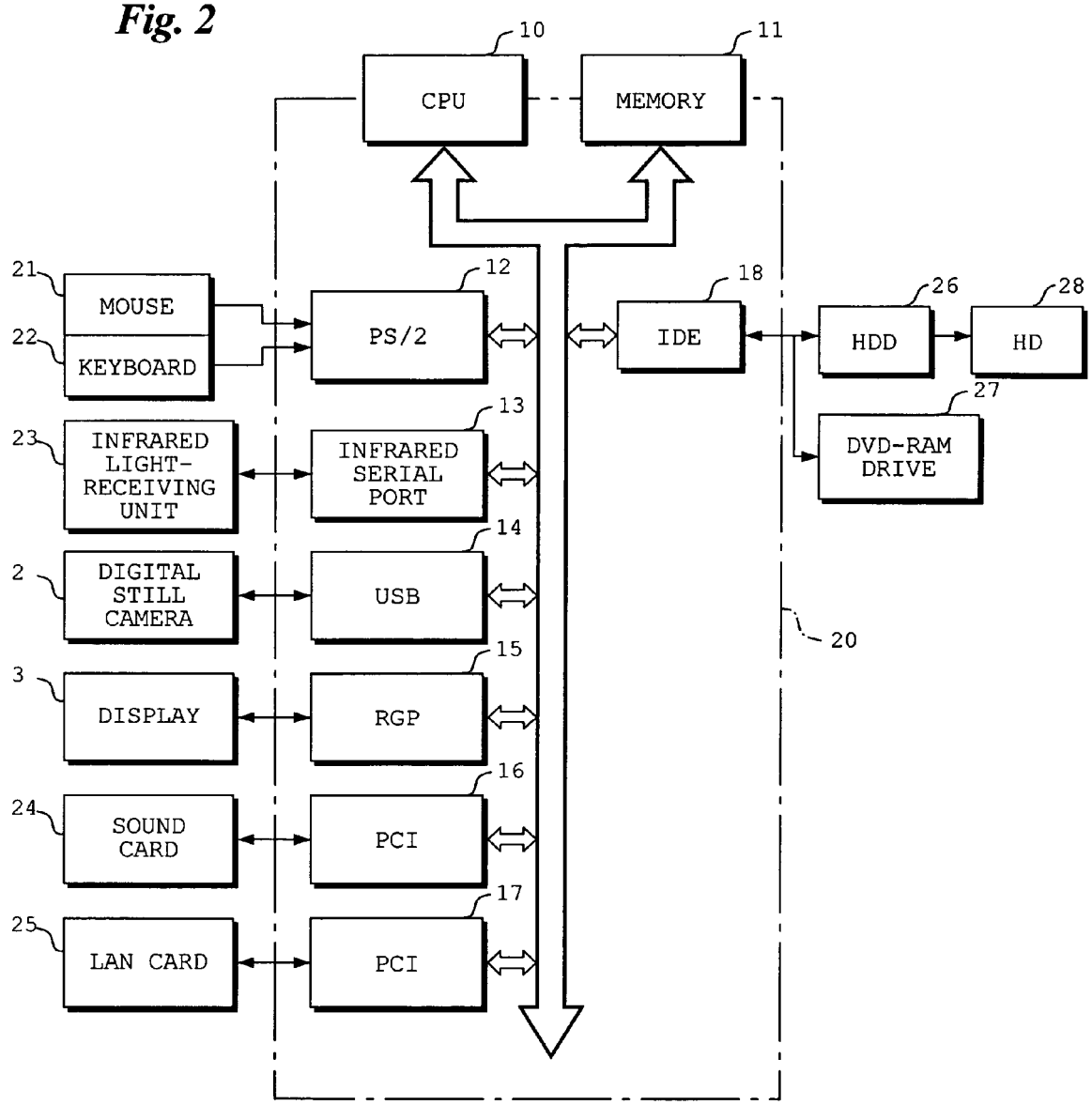
FIG. 2 is a block diagram illustrating the electrical structure of an image archiving apparatus.

FIG. 2 is a block diagram illustrating the electrical structure of the image archiving apparatus 1.

The image archiving apparatus 1 includes a mother board 20. The operation of the image archiving apparatus 1 is controlled by a CPU 10 mounted on the mother board 20.

A memory 11 that stores data temporarily is connected to the CPU 10 via a bus. Also connected to the CPU 10 via buses are a PS/2 port for connecting a mouse 21 and keyboard 22, an infrared serial port 13, a USB (Universal Serial Bus) port 14, an RGP port 15, PCI (Peripheral Component Interconnect) ports 16 and 17, and an IDE (Integrated Drive Electronics) port 18.

An infrared light-receiving unit 23 for receiving commands and the like, which are transmitted by an infrared beam from the mobile telephone 4, is connected to the infrared serial port 13. The digital still camera 2 is connected to the USB port 14. The display unit 3 is connected to the RGB port 15. A sound card 24 is connected to one PCI port 16 and a LAN (Local Area Network) card 25 is connected to the other PCI port 17. The image archiving apparatus 1 can be connected to the Internet using the LAN card 25.

A hard-disk drive 26 for accessing a hard disk 28 on which image files and the like have been recorded and a DVD-RAM drive 27 for accessing a DVD-RAM (Digital Versatile Disc—Random-Access Memory) are connected to the IDE port 18.

Figure 3:
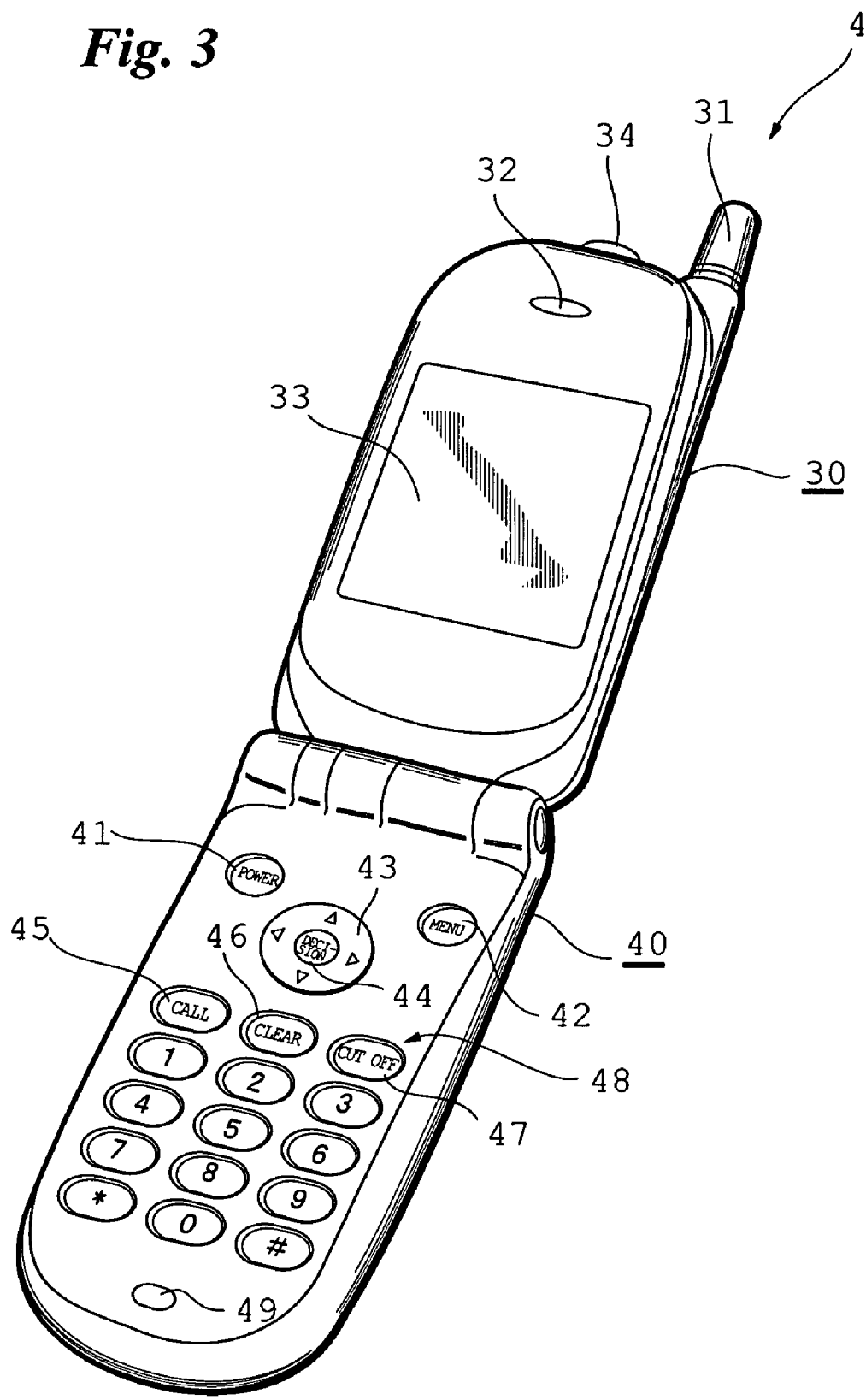
FIG. 3 illustrates the external appearance of a mobile telephone.

FIG. 3 illustrates the external appearance of the mobile telephone 4.

The mobile telephone 4 includes a first half 30 and a second half 40. The first and second halves 30 and 40 are freely foldable in such a manner that their inner faces will be brought face to face.

The distal end of the first half 30 is provided with an antenna 31 on its right side. Further, the distal end of the first half 30 is provided with an infrared emitting unit 34 for transmitting a command to the image archiving apparatus 1 by infrared communication.

The inner face of the first half 30 is provided at its upper part with a speaker 32. Formed below the speaker 32 is a display screen 0.33 that extends over substantially the entire inner surface of the first half 30.

The inner face of the second half 40 is provided at its upper part with a power button 41 and menu button 42. Formed below the power button 41 and menu button 42 is an up, down, left, right button 43 having an annular shape and on which up, down, left and right arrows are formed and are capable of being pressed. The central portion of the up, down, left, right button 43 is formed to have an ENTER button 44.

Formed below the up, down, left, right button 43 are a call originating button 45, a clear button 46 and a disconnect button 47. A numeric keypad 48 is provided below the buttons 45 to 47. Furthermore, a microphone 49 is provided at the lowermost portion of the second half 40.

Figure 4:
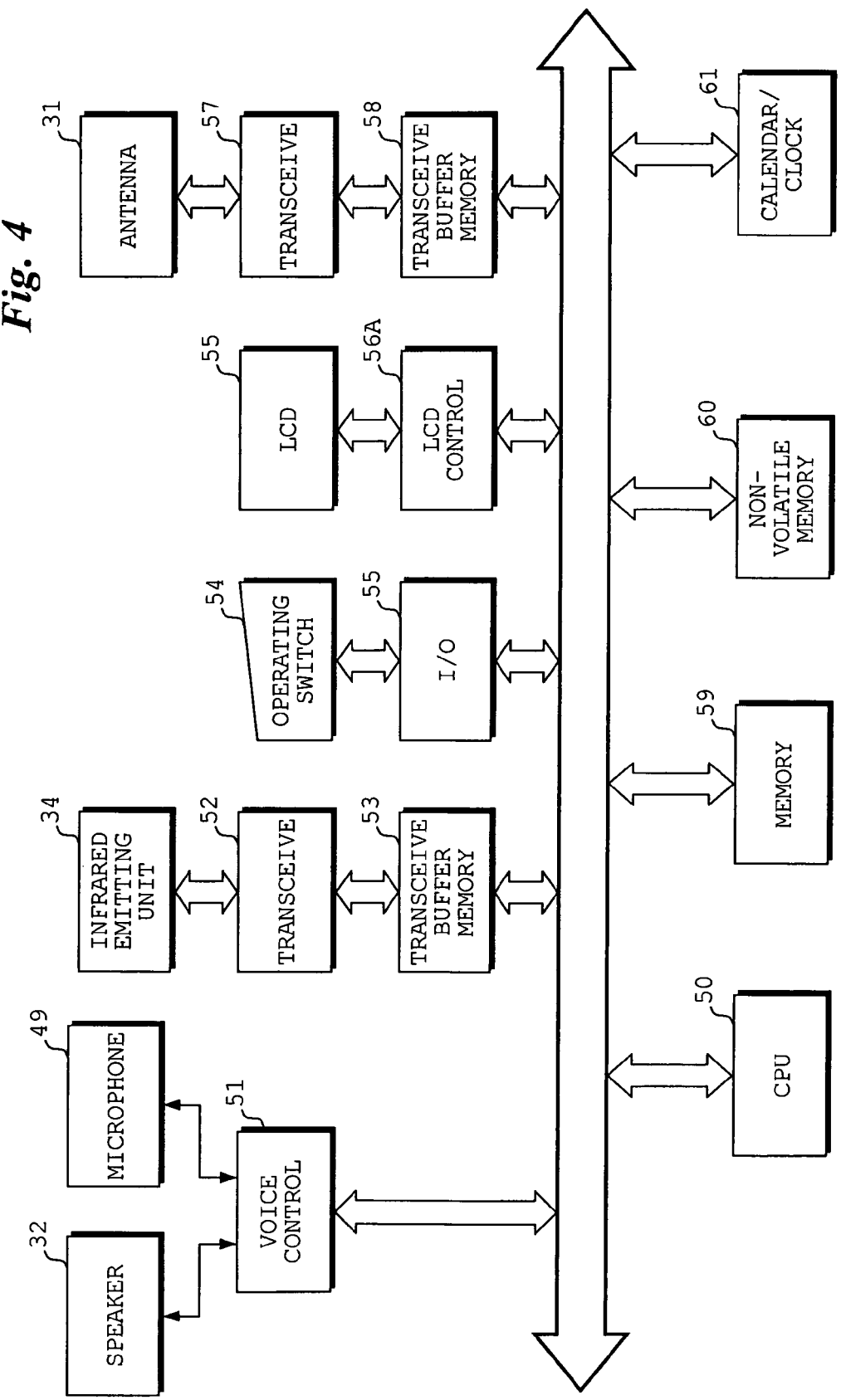
FIG. 4 is a block diagram illustrating the electrical structure of the mobile telephone.

FIG. 4 is a block diagram illustrating the electrical structure of the mobile telephone 4.

The operation of the overall mobile telephone 4 is controlled by a CPU 50.

The mobile telephone 4 includes a memory 59 for storing data temporarily, a non-volatile memory 60 in which an operating program and prescribed data, etc., have been stored, and a calendar/clock 61.

The mobile telephone 4 further includes a voice control circuit 51 for introducing voice, which is applied to the above-mentioned microphone 49, to the mobile telephone 4 as voice data, and for outputting the voice from the speaker 32. The mobile telephone 4 further includes the infrared emitting unit 34, which is controlled by an infrared transceiver 52. Data that has been stored in a transceive buffer memory 53 is output from the infrared emitting unit 34 by an infrared beam.

As mentioned above, signals from an operating switch 54 that includes buttons such as the power button 41, menu button 42, up, down, left, right button 43 and ENTER button 44 are input to the mobile telephone 4 by an input/output unit 55. By operating the operating switch 54 of the mobile telephone 4, a command that conforms to this operation is applied from the mobile telephone 4 to the image archiving apparatus 1, whereupon the image archiving apparatus 1 operates in accordance with this command.

The mobile telephone 4 is provided with a liquid crystal display device 56 having the above-mentioned display screen 33. The liquid crystal display device 56 has its display controlled by a control circuit 56A for controlling the liquid crystal display device 56. The mobile telephone 4 further includes the above-mentioned antenna 31, a transceive circuit 57 and a transceive buffer memory 58 that are for receiving voice data and image data, etc., transmitted from another mobile telephone, etc., and for transmitting voice data and image data, etc., to another mobile telephone, etc.

Figure 5:
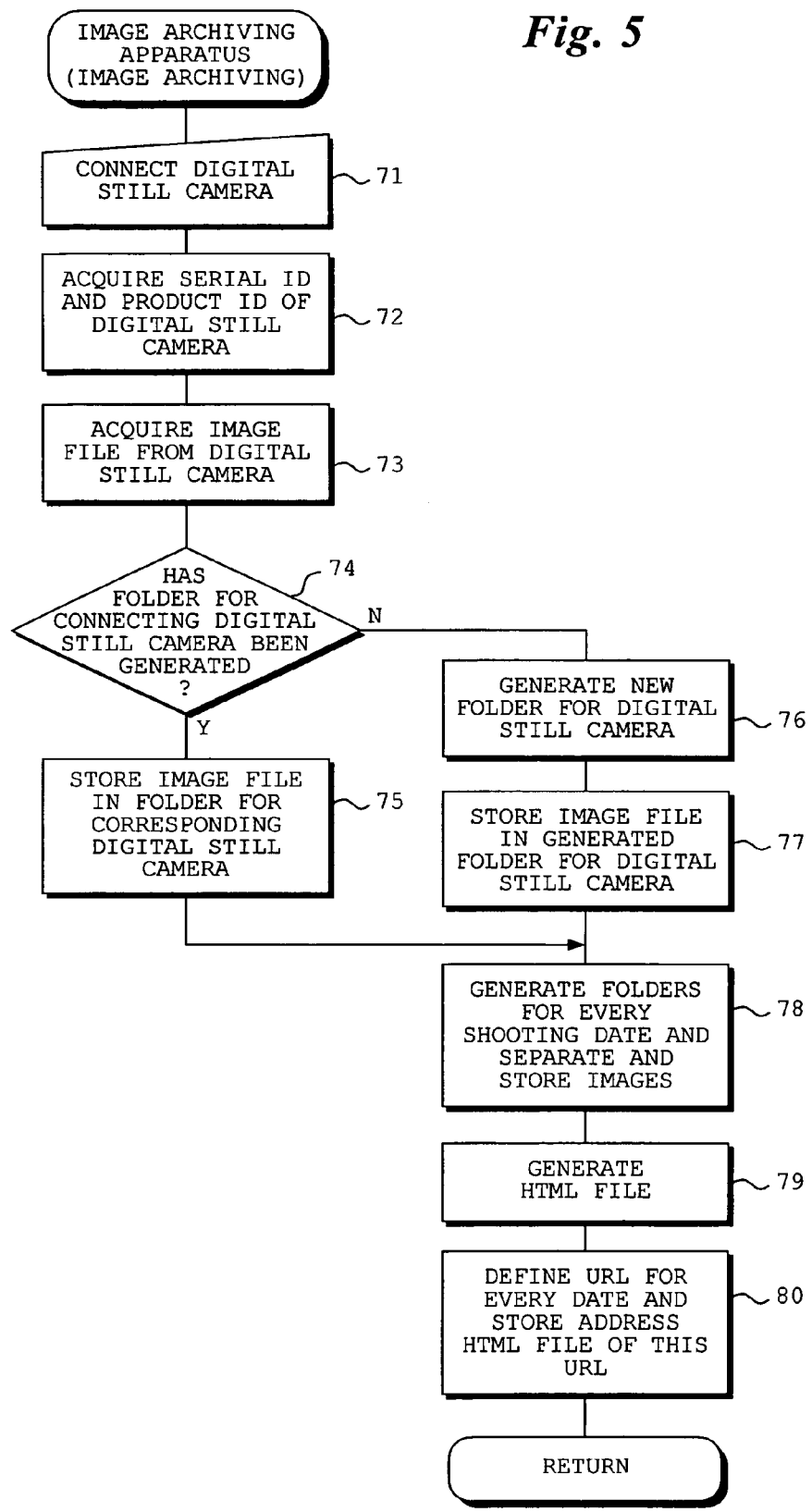
FIG. 5 is a flowchart illustrating processing executed by the image archiving apparatus in a case where an image is archived.
Figure 6:
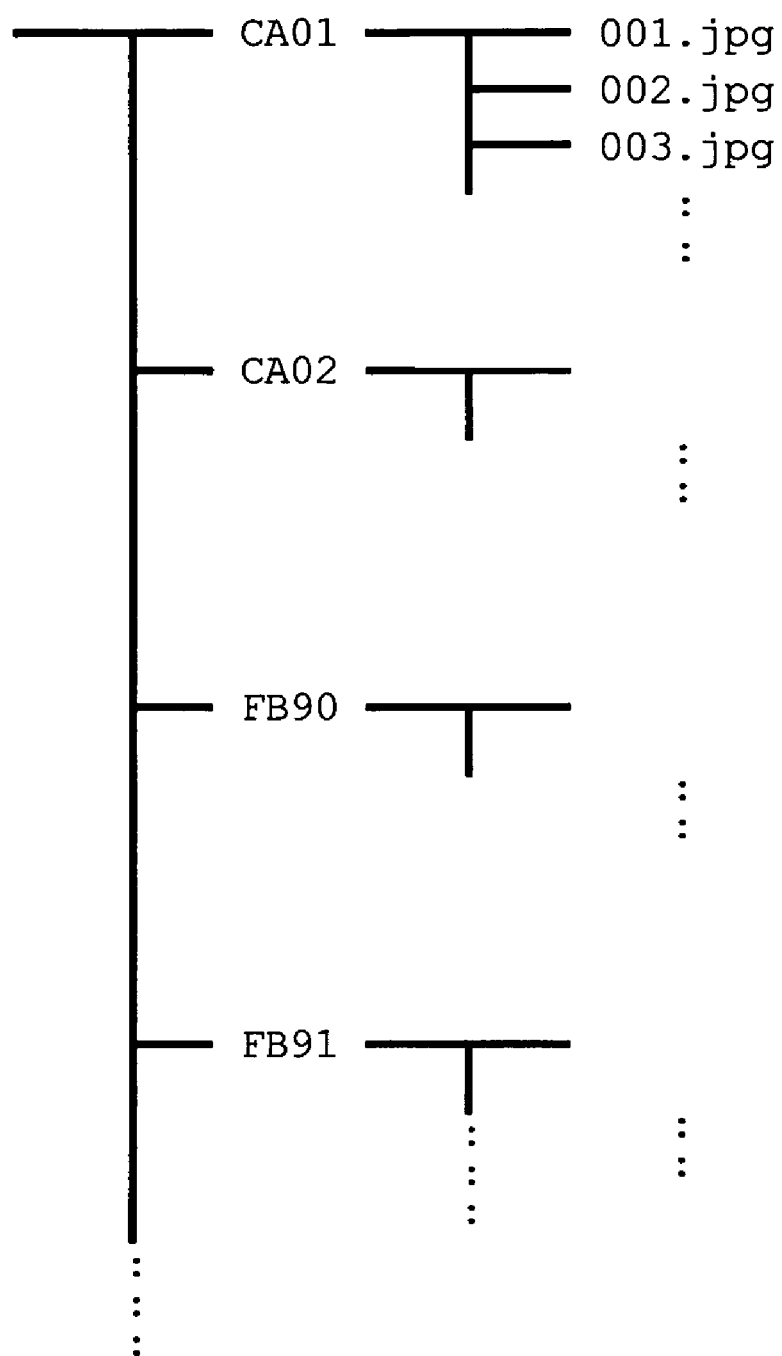
FIGS. 6 and 7 illustrate directory structures of the image archiving apparatus.
Figure 7:
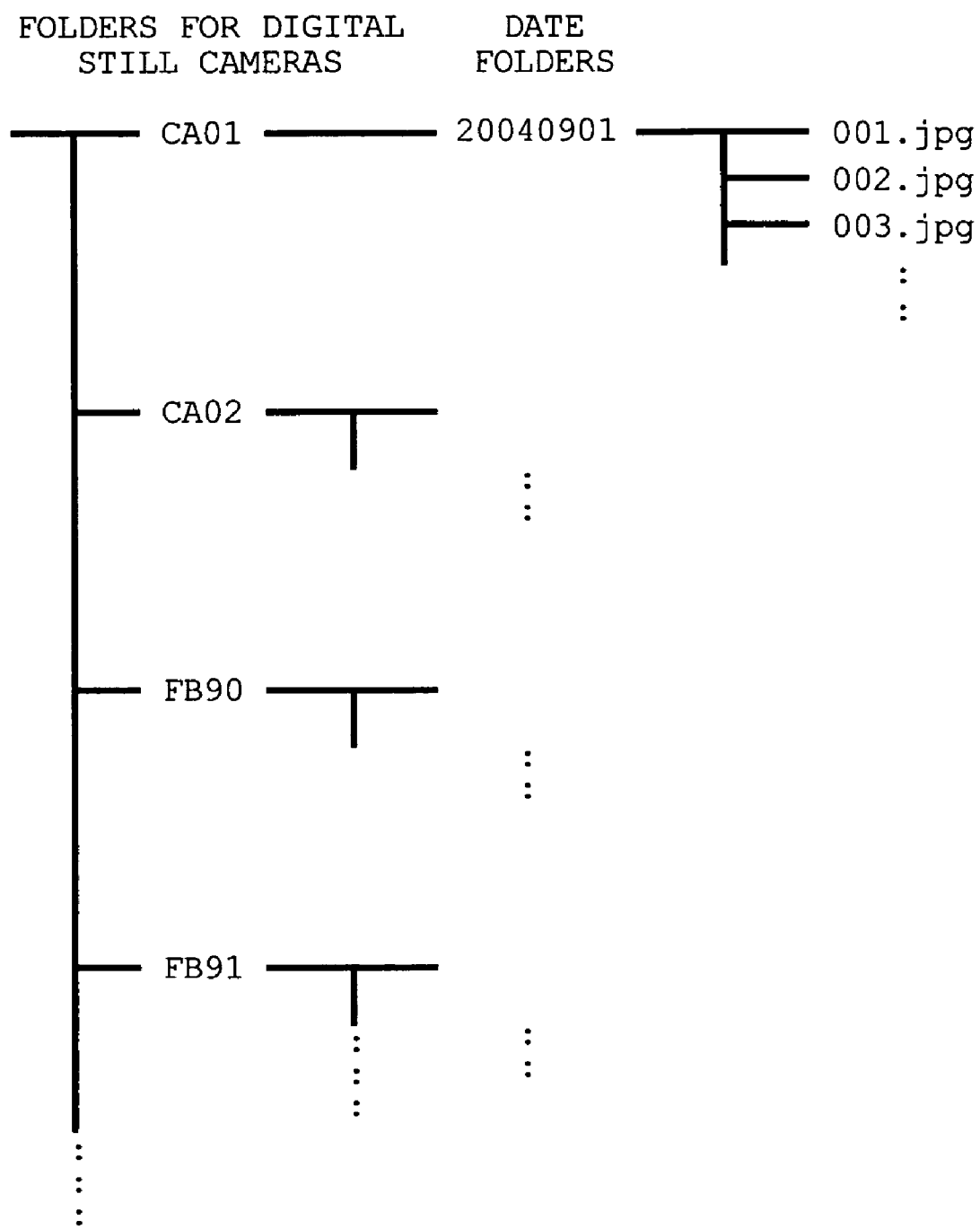
Figure 8:
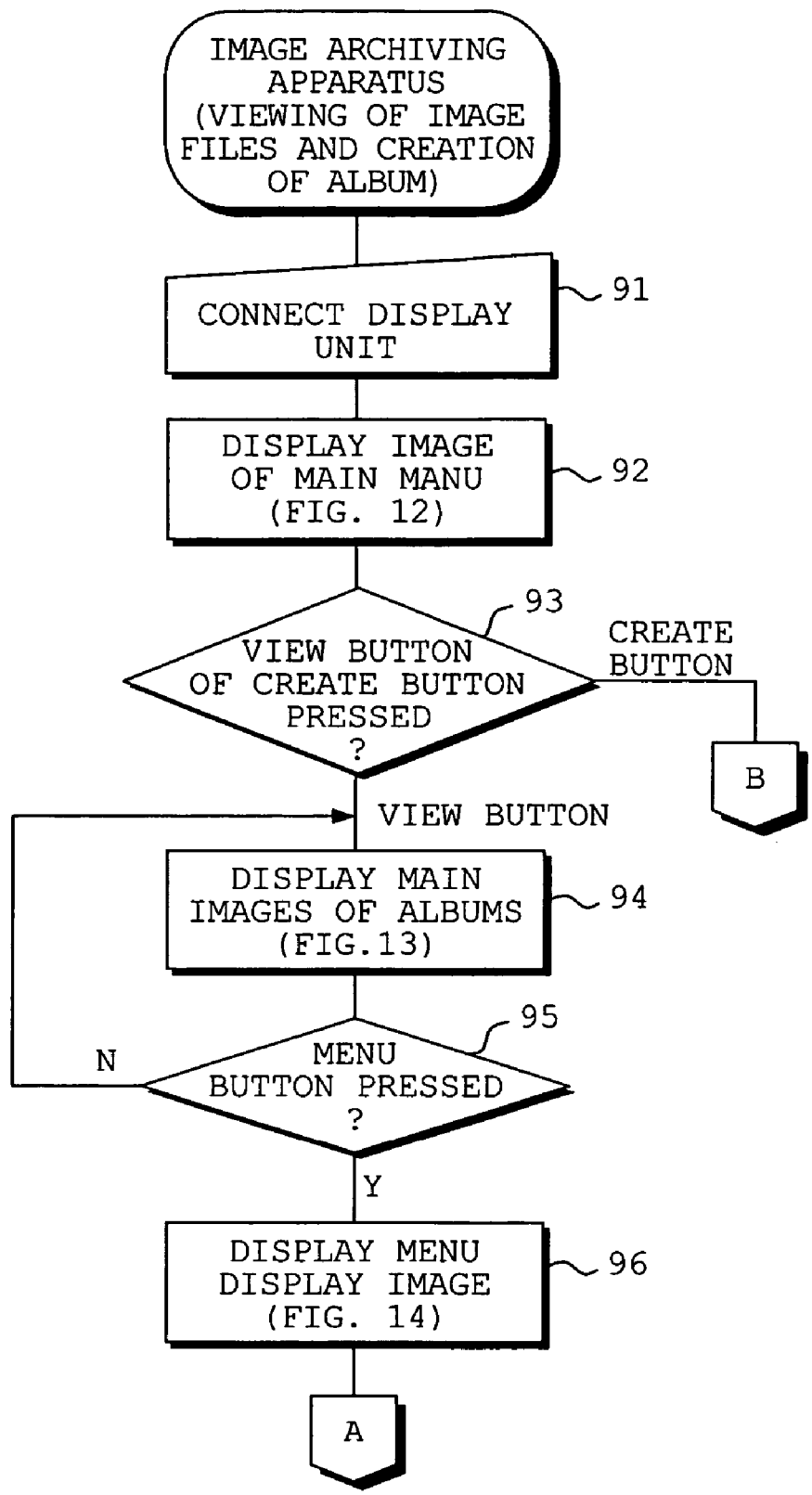
FIGS. 8 to 11 are flowcharts illustrating processing executed by the image archiving apparatus for viewing images and creating an album.

FIG. 5 is a flowchart illustrating processing executed by the image archiving apparatus 1 when an image is archived, and FIGS. 6 and 7 illustrate examples of directory structures of the image archiving apparatus 1.

The processing executed by the image archiving apparatus 1 generates, for every device (digital still camera) that applies image files to the image archiving apparatus 1, a digital still camera folder having one-to-one correspondence with this device, and stores the image files applied to the corresponding folder. Furthermore, a date folder for every shooting date of the image files is generated among the digital still camera folders, and image files having a date corresponding to the date of the date folder are stored inside this date folder.

First, the image archiving apparatus 1 and digital still camera 2 are connected together by a USB cable (step 71). When this is done, the serial ID and product ID of the digital still camera 2 are transmitted from the digital still camera 2 to the image archiving apparatus 1 (it goes without saying that the mode of the digital still camera 2 has been set to a mode that transfers image files), and the image archiving apparatus 1 acquires the serial ID and the product ID (step 72). Further, an image file is transmitted from the digital still camera 2 to the image archiving apparatus 1 and the image archiving apparatus 1 reads this image file (step 73).

Next, it is determined whether a digital still camera folder having one-to-one correspondence with the digital still camera 2 that has been connected to the image archiving apparatus 1 has already been generated in the image archiving apparatus 1 (step 74). If the models of cameras are the same, the cameras will have the same product ID but different serial IDs. Even if image files are supplied from digital still cameras 2 of the same model type, therefore, the image files supplied will be stored in the digital still camera folders for respective ones of the cameras. Of course, a digital still camera folder may be specific to every model and not specific to every serial ID and product ID. It will be assumed below that a digital still camera folder that is specific to every model is generated.

If a folder for a digital still camera that has been connected to the image archiving apparatus 1 has already been generated in the image archiving apparatus 1 ("YES" at step 74), then the image file that has been read is stored in the corresponding digital still camera folder (step 75). If the corresponding digital still camera folder has not been generated ("NO" at step 74), then the image archiving apparatus 1 generates a new digital still camera folder having a folder name that is the model of the digital still camera 2 connected to the image archiving apparatus 1 (step 76). It goes without saying that the model name also is applied to the image archiving apparatus 1 from the digital still camera 2. The image file that has been read is stored in the generated digital still camera folder (step 77).

As shown in FIG. 6, a number of digital still camera folders having folder names such as "CA01", "CA02", "FB90" AND "FB91" (these correspond to the model names of digital still cameras) have been generated in the image archiving apparatus 1.

If the model name of the digital still camera 2 connected to the image archiving apparatus 1 is "CA01" and the file names of read image files are "001.jpg", "002.jpg", "003.jpg", etc., then image files of "001.jpg", "002.jpg", "003.jpg", etc. will be stored in the digital still camera folder having the folder name "CA01", as illustrated in FIG. 6. It goes without saying that if a digital still camera folder of folder name "CA01" has not been generated, then the folder is generated anew and stored.

With reference again to FIG. 5, folders (date folders) for every shooting date of images represented by read image files are generated hierarchically under the digital still camera folder (step 78). Image files obtained by photography on a date corresponding to a generated date folder are stored in this date folder. It goes without saying that the shooting date is obtained from header information of the image file.

FIG. 7 illustrates the manner in which a date folder is generated hierarchically under a digital still camera folder.

It will be assumed that the shooting date of images represented by the image files having the file names "001.jpg", "002.jpg", "003.jpg", etc. is Sep. 1, 2004. In such case a date folder having the folder name "20040901", which corresponds to the shooting date, is generated from this shooting date. The image files that were captured on the corresponding shooting date (namely the image files having the file names "001.jpg", "002.jpg", "003.jpg", etc.) are stored in the generated date folder.

With reference again to FIG. 5, an HTML (HyperText Markup Language) file is generated using an image file that has been stored in a date folder (step 79). In addition, an URL (Uniform Resource Locator) that includes this date is generated and the HTML file that has been generated is stored in an area specified by this URL (step 80). By accessing this URL, a web page represented by the generated HTML file can be viewed.

FIGS. 8 to 11 are flowcharts illustrating processing executed by the image archiving apparatus 1 for viewing images and creating an album, and FIGS. 12 to 19 are examples of images displayed on the display screen of the display unit 3 connected to the image archiving apparatus 1. In the embodiment illustrated below, it will be assumed that image files have been stored on a per-date-folder basis in the manner described above and, in addition, that image files have been stored in a folder having a folder name different from a date (such a folder is an album in the example below). The viewing and creation of such an album will be performed.

First, the display unit 3 is connected to the image archiving apparatus 1 (step 91). When this is done, an image of a main menu shown in FIG. 12 is displayed on the display screen of the display unit 3 (step 92).

Figure 12:
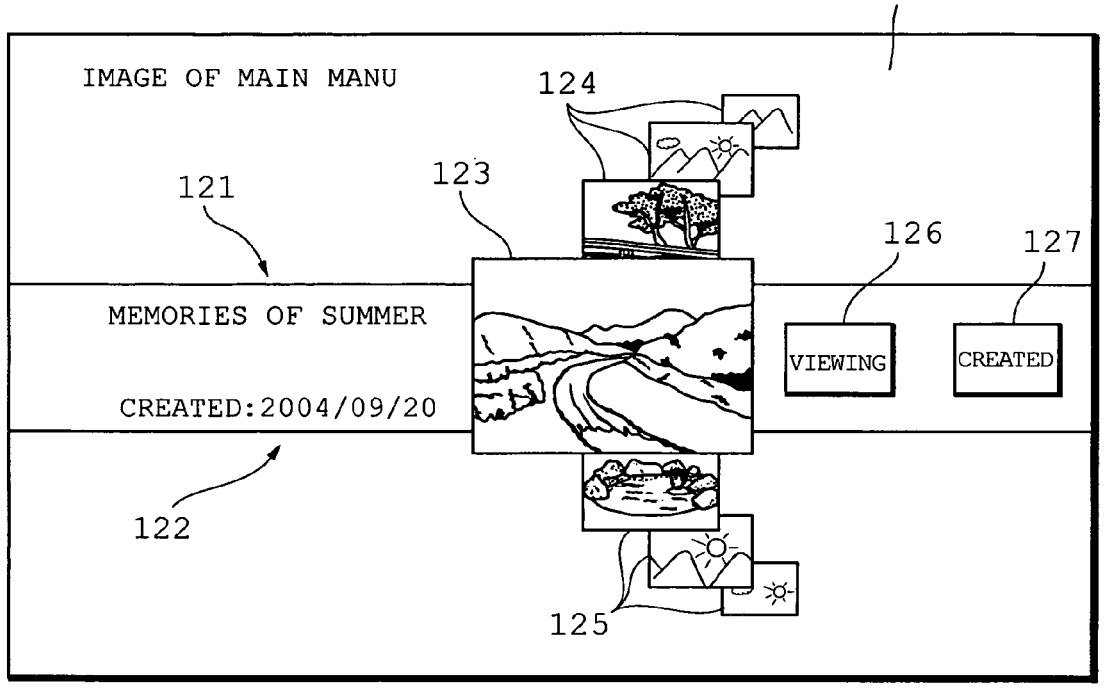
FIGS. 12 to 19 are examples of images displayed on the image archiving apparatus.

As shown in FIG. 12, a representative thumbnail image 123 from among images represented by image files that have been stored in an album (folder) is being displayed approximately at the center of the image of the main menu displayed on a display screen 120 of the display unit 3. (The representative thumbnail image 123 may be the image that was stored first or an image whose file name is first when the file names are put in order.) The album containing the image 123 being displayed at the center is the album that is currently being selected by the user. Representative images 124 of other albums are being displayed as a series to the upper right of the representative image 123. Similarly, representative images 125 of other albums are being displayed as a series to the lower right of the representative image 123. The representative image 123 at the center is the largest, and the sizes of the images 124 and 125 become progressively smaller as they become more distant from the center along the directions to the upper right and lower right.

An album name (folder name) 121 of the album containing the representative image 123 is being displayed on the left side of the centrally located representative image 123. The date (created through a method described later) 122 on which the album was created is being displayed below the album name 121.

A view button 126 and a create button 127 are being displayed as operating buttons on the right side of the centrally located representative image 123. The view button 126 is selected by the user in a case where an image represented by an image file contained in the selected album is to be viewed. The create button 127 is selected by the user in a case where an album is to be created anew.

The user is capable of applying a command to the image archiving apparatus 1 using the mobile telephone 4, as mentioned above. If the up arrow or down arrow on the up, down, left, right button 43 of mobile telephone 4 is pressed in a case where the main-menu image illustrated in FIG. 12 is being displayed on the display screen 120 of the display unit 3, data indicating that the arrow has been pressed is transmitted from the mobile telephone 4 to the image archiving apparatus 1 by infrared communication. If the up arrow has been pressed, the thumbnail image 123 being displayed approximately at the center of the main-menu image and the image 124 being displayed at the upper right of the image 123 are interchanged. The newly selected thumbnail image is thus displayed at the central portion of the main menu image. An album specified by the image 125 will be selected in similar fashion in a case where the down arrow on the up, down, left, right button 43 of mobile telephone 4 has been pressed.

Selection of the view button 126 or create button 127 is switched back and forth in accordance with depression of the right arrow or left arrow on the up, down, left, right button 43 of mobile telephone 4.

If the ENTER button 44 of mobile telephone 4 is pressed, then selection of the album having the centrally displayed image as its representative image is decided as well as the view or create operation selected by the view button 126 or create button 127.

With reference again to FIG. 8, assume that the view button 126 has been selected (step 93). In such case the main images of the albums shown in FIG. 13 are displayed on the display screen 120 of the display unit 3 (step 94).

Figure 13:
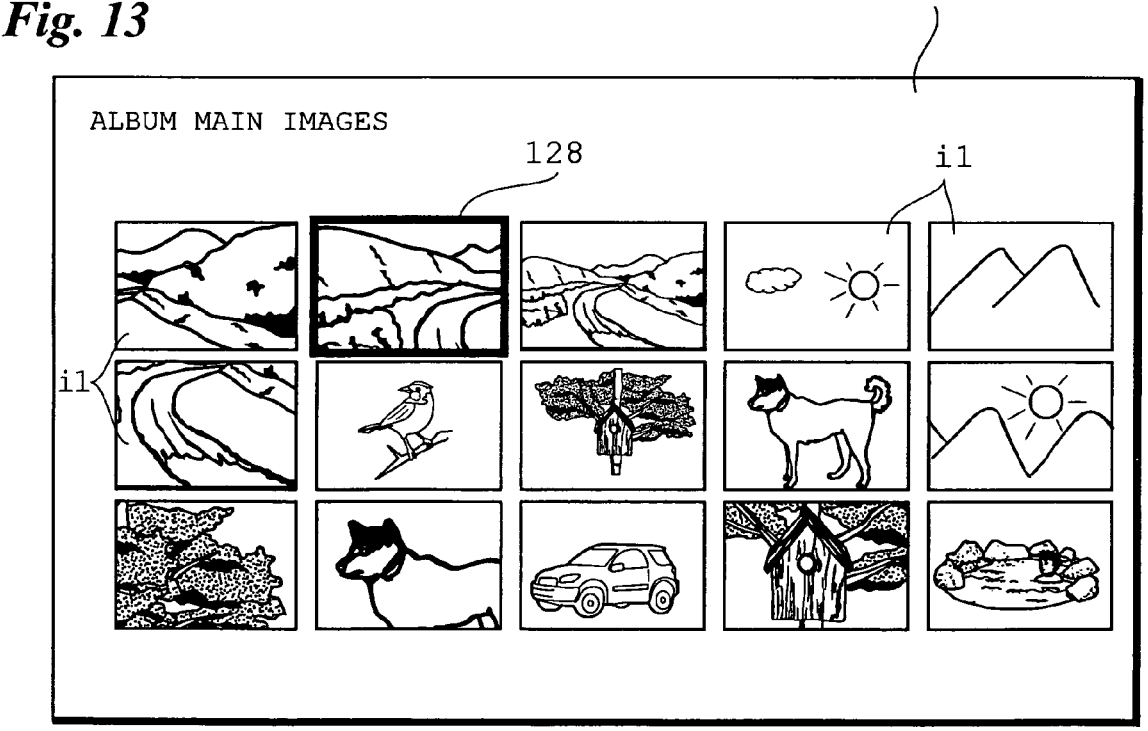

As shown in FIG. 13, a number of thumbnail images i1 are being displayed in the horizontal and vertical directions of the album main images. These thumbnail images are represented by image files contained in the selected album. A cursor 128 is being displayed so as to enclose one thumbnail image among these thumbnail images i1.

The cursor 128 is moved up, down, right and left in accordance with depression of the up, down, right and left arrows on the up, down, left, right button 43 of mobile telephone 4 in a manner similar to that described above.

Figure 14:
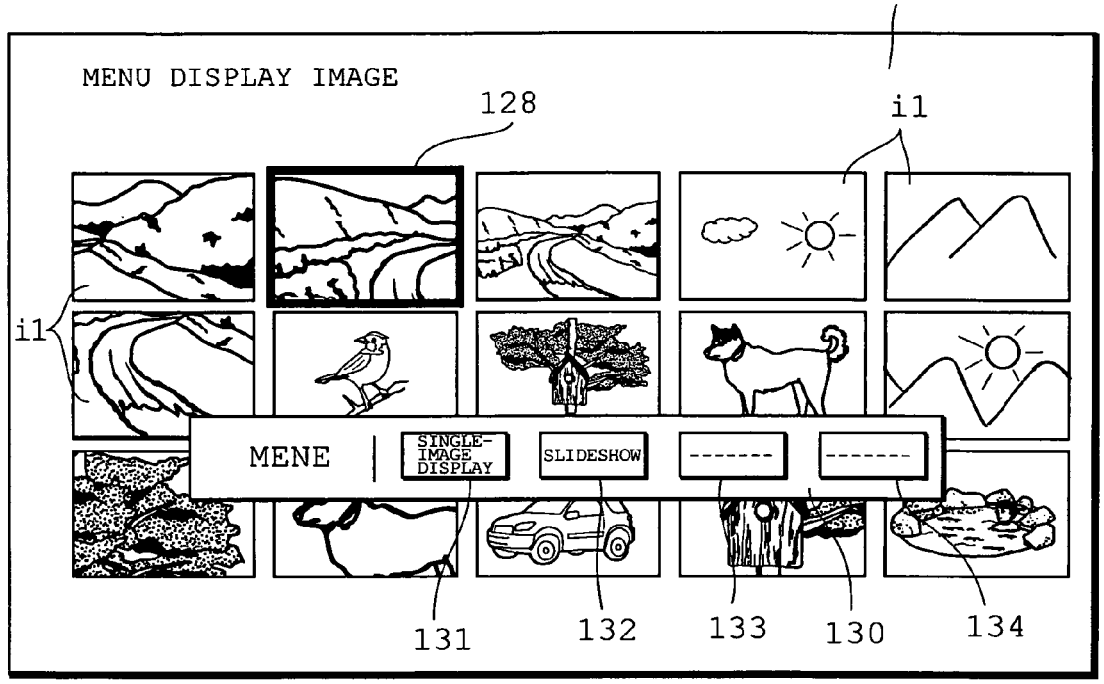
Figure 15:
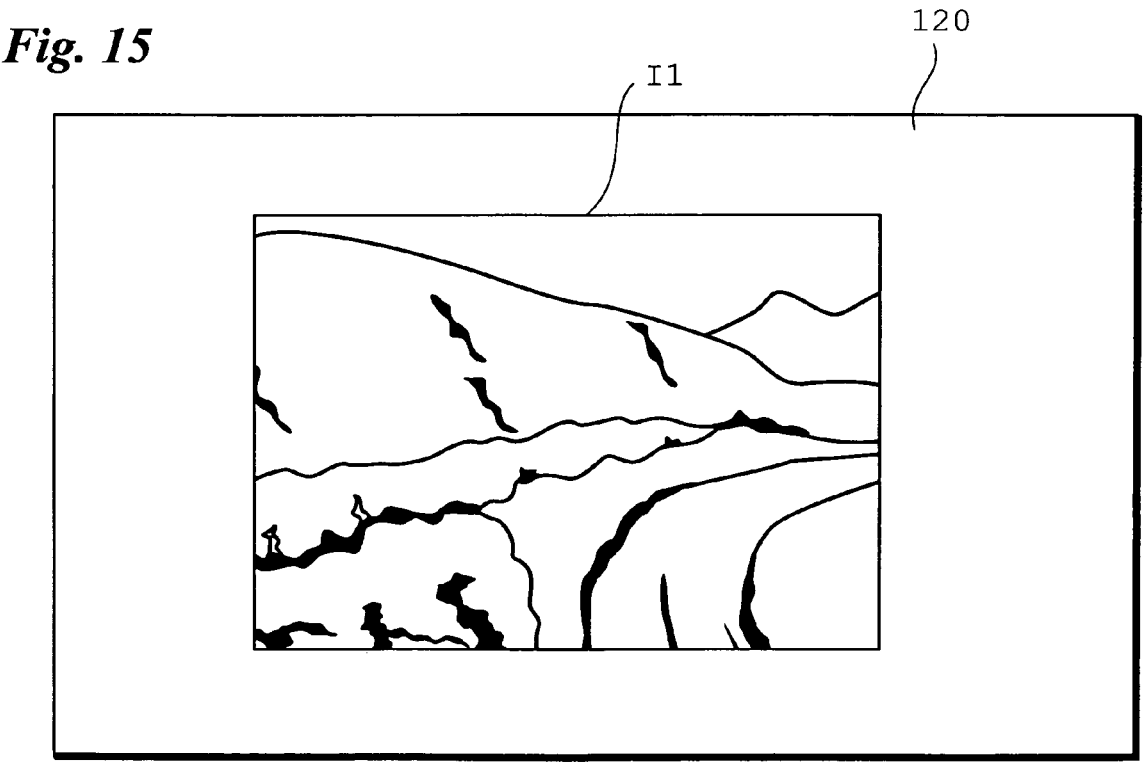

With reference again to FIG. 8, if the menu button 42 on mobile telephone 4 is pressed ("YES" at step 95), a menu display image shown in FIG. 14 will be displayed on the display screen 120 (step 96).

As shown in FIG. 14, a menu area 130 is being displayed in a form superimposed on the thumbnail images i1 horizontally of the main display image substantially at the center thereof. A single-image display button 131, a slideshow button 132 and other buttons 133 are being displayed in the menu area 130. The single-image display button 131 is selected by the user in a case where a single frame of a selected image is to be displayed on the entire display screen 120. The slideshow button 132 is selected by the user in a case where images represented by image files contained in a selected album are to be displayed in the form of a slideshow. The up, down, left, right button 43 on the mobile telephone 4 is used in the manner described above to select these buttons.

Figure 9:
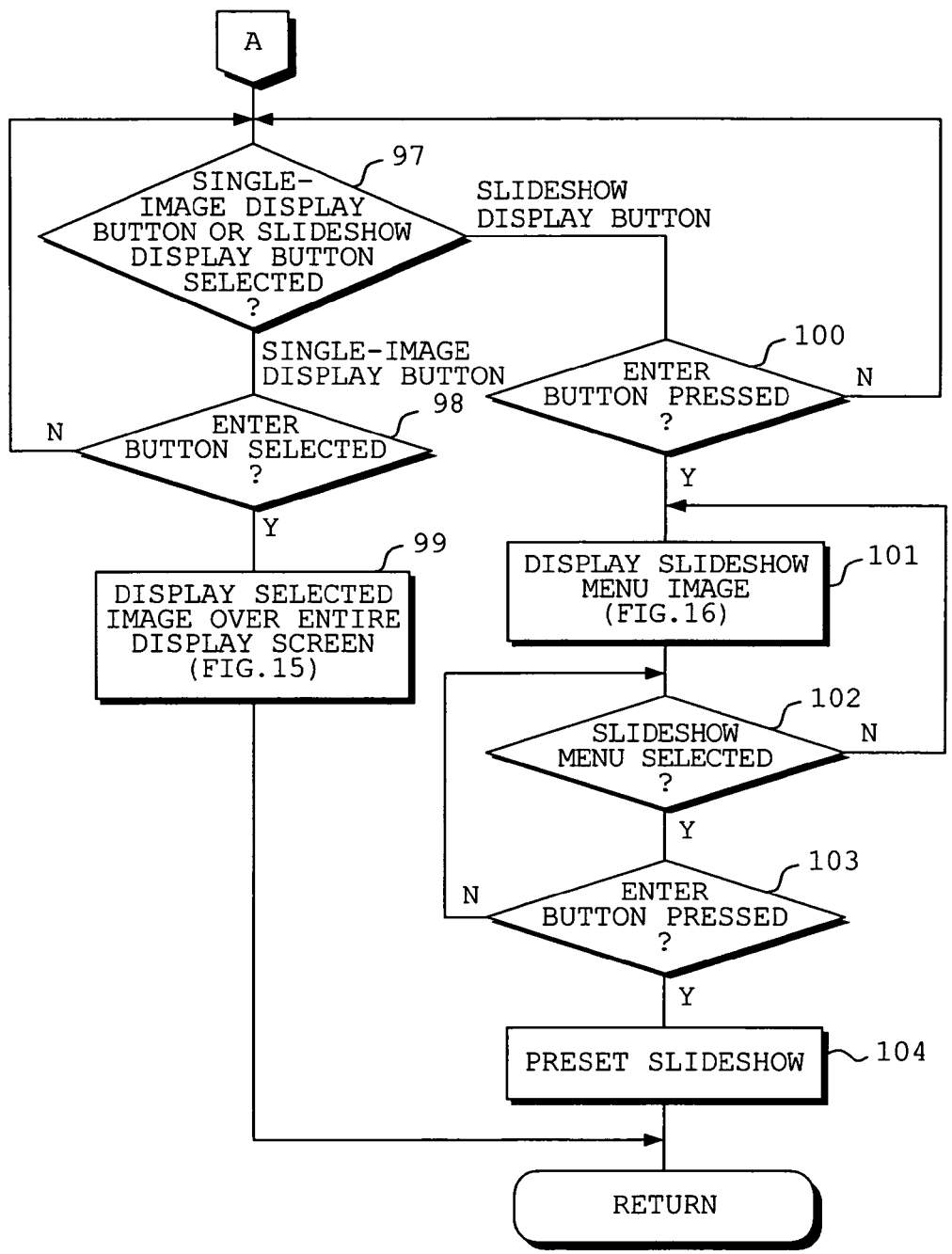

First, assume that the single-image display button 131 has been pressed (step 97) in FIG. 9. If the ENTER button 44 on mobile telephone 4 is pressed ("YES" at step 98), then an image 11 that has been selected by the cursor 128 will be displayed as a single frame on the entire display screen 120 (step 99) (see FIG. 15).

Figure 16:
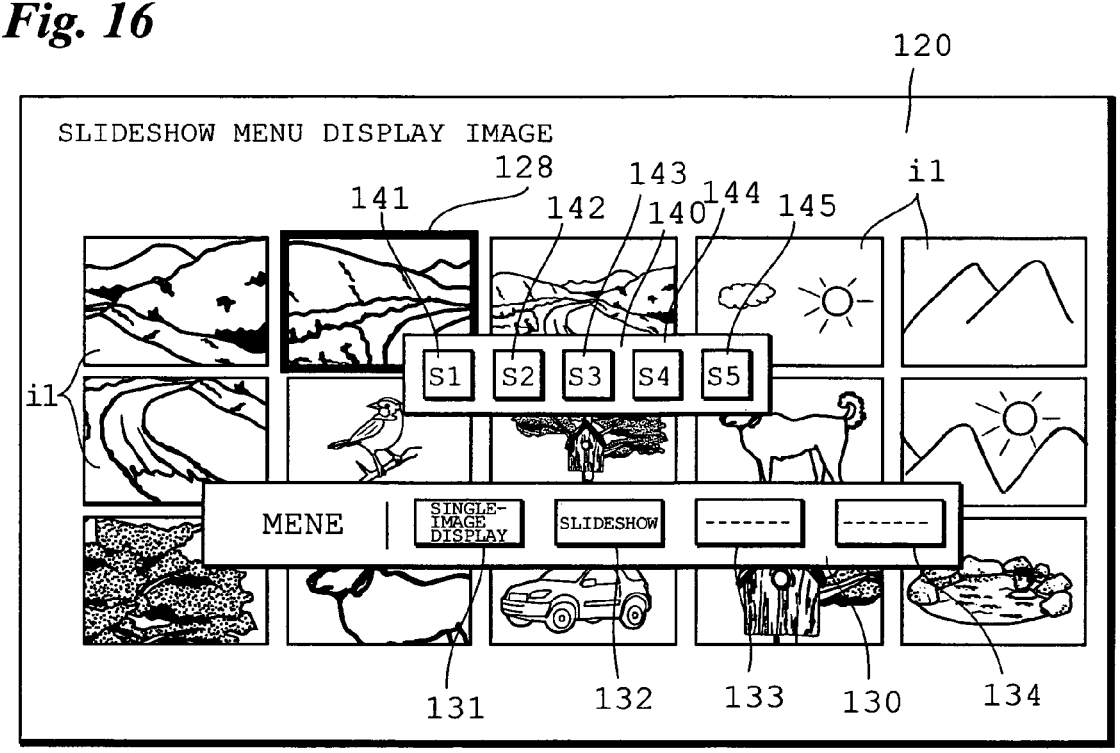

If the slideshow button 132 is selected (step 97) and the ENTER button 44 is pressed ("YES" at step 100), a slideshow menu display image shown in FIG. 16 is displayed on the display screen 120 (step 101).

As shown in FIG. 16, a slideshow menu area 140 is being displayed above the menu area 130 on the slideshow menu display image. The slideshow menu area 140 includes buttons 141 to 145 for selecting a variety of slideshow presentations. For example, button 141 is selected using the mobile telephone 4 in order to present a simple slideshow in which the images represented by the image files contained in the selected album are displayed one after another at regular time intervals. Button 142 is selected using the mobile telephone 4 in order to present a remembrance sepia-colored slideshow in which the images are changed to a sepia color and displayed one after another at regular time intervals. The other buttons 143 to 145 are selected using the mobile telephone in order to display slideshows in respective ones of different presentations.

With reference again to FIG. 9, if any button is selected in the slideshow menu area 140 ("YES" at step 102), then, in response to depression of the ENTER button 44 on mobile telephone 4 ("YES" at step 103), the images represented by the image files contained in the selected album start being displayed in a slideshow in accordance with the slideshow presentation selected (step 104).

Described next will be a case where the create button 127 has been selected when the main menu image (see FIG. 12) is being displayed. In an instance where an album is to be created, the create button 127 is selected using the mobile telephone 4, as mentioned above.

Figure 10:
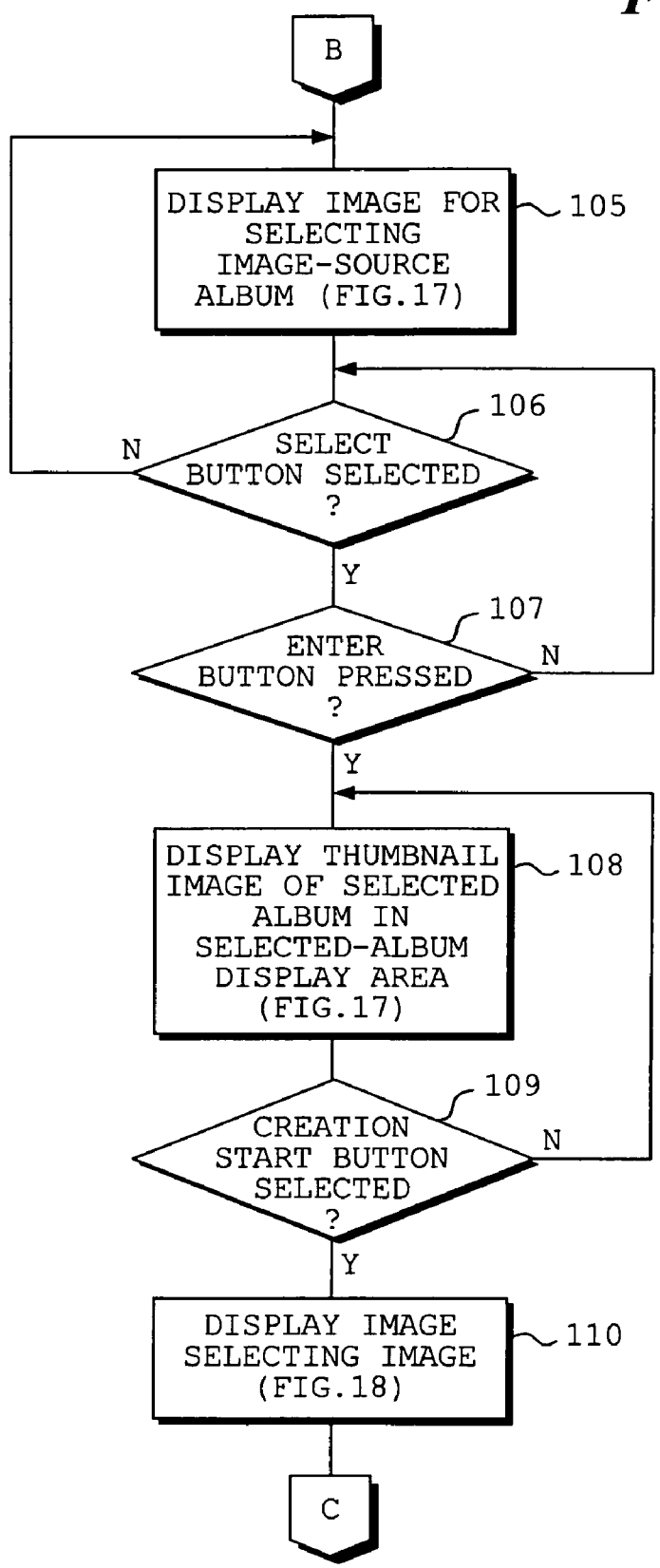
Figure 17:
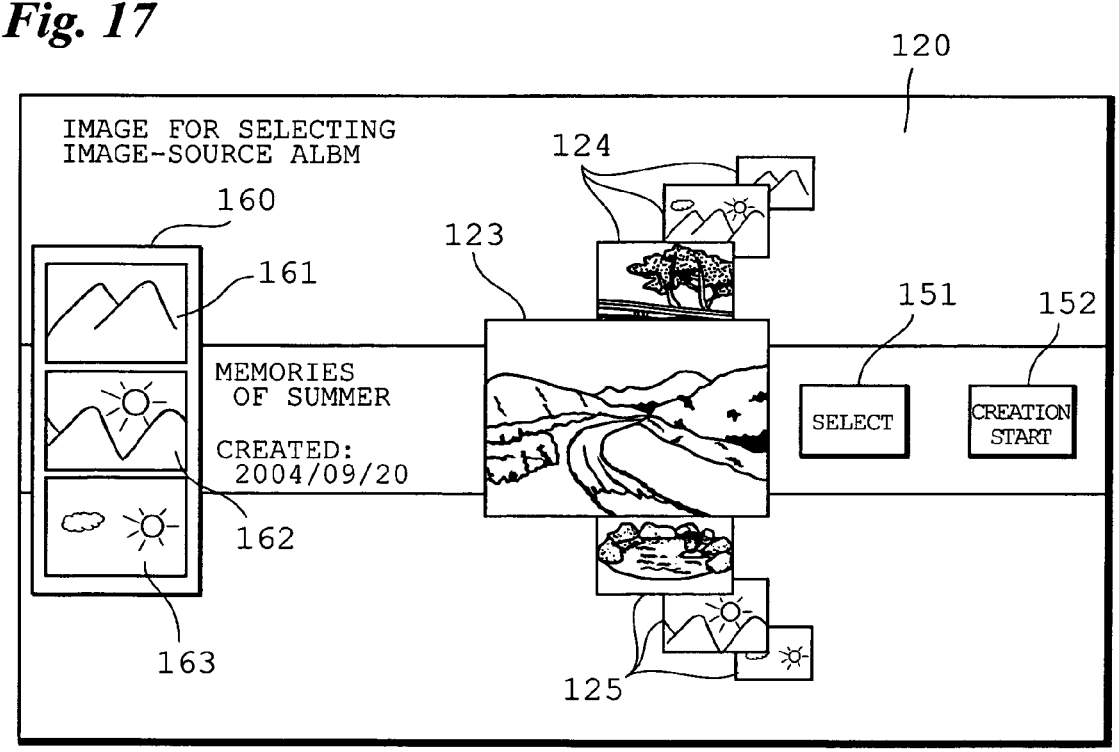

If the create button 127 is selected, an image shown in FIG. 17 for selecting an album that is to be the source of image loading is displayed on the display screen 120 at step 105 in FIG. 10.

As shown in FIG. 17, a select button 151 and a creation start button 152 are being displayed on the right side of the central thumbnail image 123 on the album selecting image. The select button 151 is selected by the user in a case where an album to be used in creation of a new album is selected. The creation start button 152 is selected by the user when selection of an album is finished and creation of an album is to be started.

A selected-album display area 160 also is formed on the right side of the image that is for selecting the album that is to be the source of images. The selected-album display area 160 is an area that displays the representative images of albums to be utilized in creating a new album selected by the user. Representative images 161 to 163 of albums that have been selected by the user are being displayed in the selected-album display area 160.

In a manner similar to that of the case where images are viewed, an album is selected by pressing the up arrow or down arrow on the up, down, left, right button 43 of mobile telephone 4, and the representative image of the selected album is displayed at the center, as indicated by the representative image 123, as described earlier. With reference again to FIG. 10, if the select button 151 is selected using the mobile telephone 4 (step 106) and the ENTER button 44 is pressed ("YES" at step 107), then, by reason of the fact that selection of the album having the image displayed at the center of the display screen 120 as its representative image has been decided, this representative image is displayed in the selected-album display area 160 (step 108).

When selection of albums utilized in a new album is finished, the creation start button 152 is selected by the user employing the mobile telephone 4 ("YES" at step 109). When this is done, an image selecting image shown in FIG. 18 is displayed on the display screen 120 (step 110).

Figure 18:
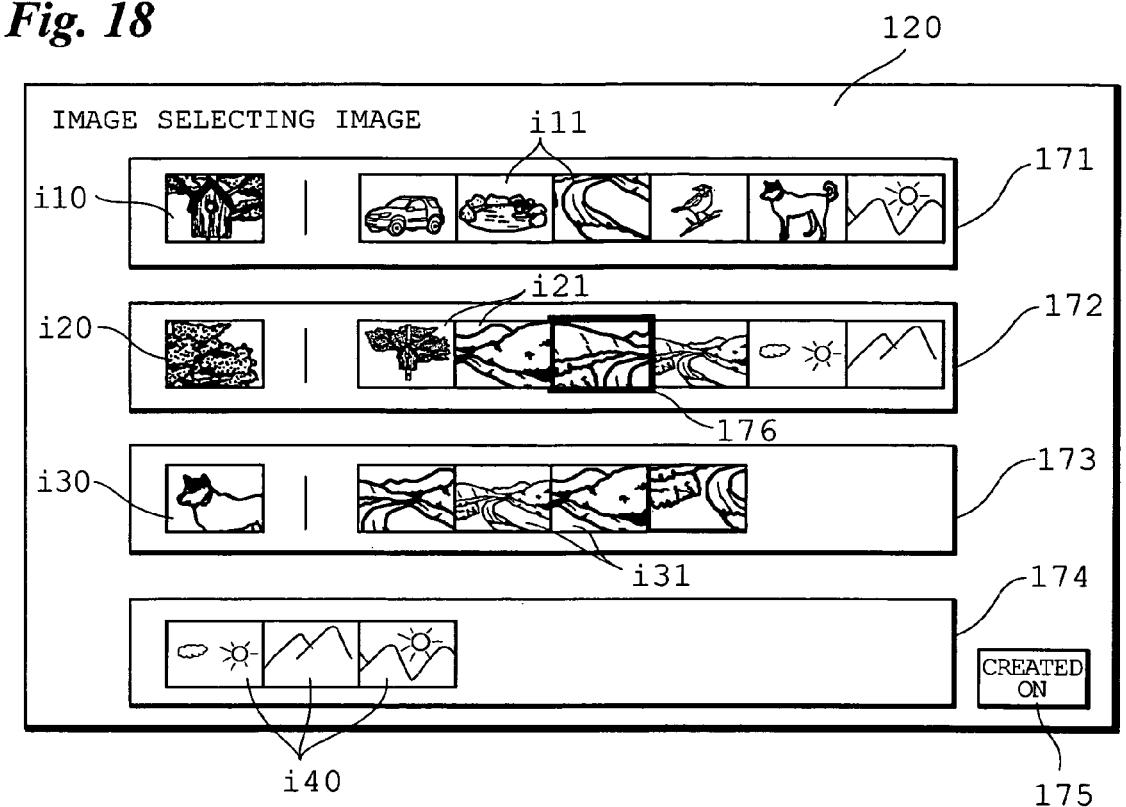

As shown in FIG. 18, album-content display areas 171 to 173 extending in the horizontal direction are arrayed vertically in the image selecting image. An area 174 that displays selected images i40 is being displayed below the album-content display areas 171 to 173. A create button 175 is being displayed at the lower right. Representative images i10, i20 and i30 of albums are being displayed on the left side of the album-content display areas 171, 172 and 173, respectively. Images i11, i21 and i31 represented by images that have been stored in respective ones of the albums are being displayed in the album-content display areas 171, 172 and 173, respectively. A cursor 176 is being displayed so as to enclose any one image among the images i11, i21 and i31. While observing these images i11, i21 and i31, the user selects, in the manner set forth below, images that are to be stored in an album created anew.

The cursor 176 moves so as to enclose image i11, i21 or i31 in conformity with depression of the up, down, left, right arrows on the up, down, left, right button 43 of mobile telephone 4. If the ENTER button 44 of mobile telephone 4 is pressed when the desired image is being enclosed by the cursor 176, the image enclosed by the cursor 176 is selected and is displayed in the area 174.

Figure 11:
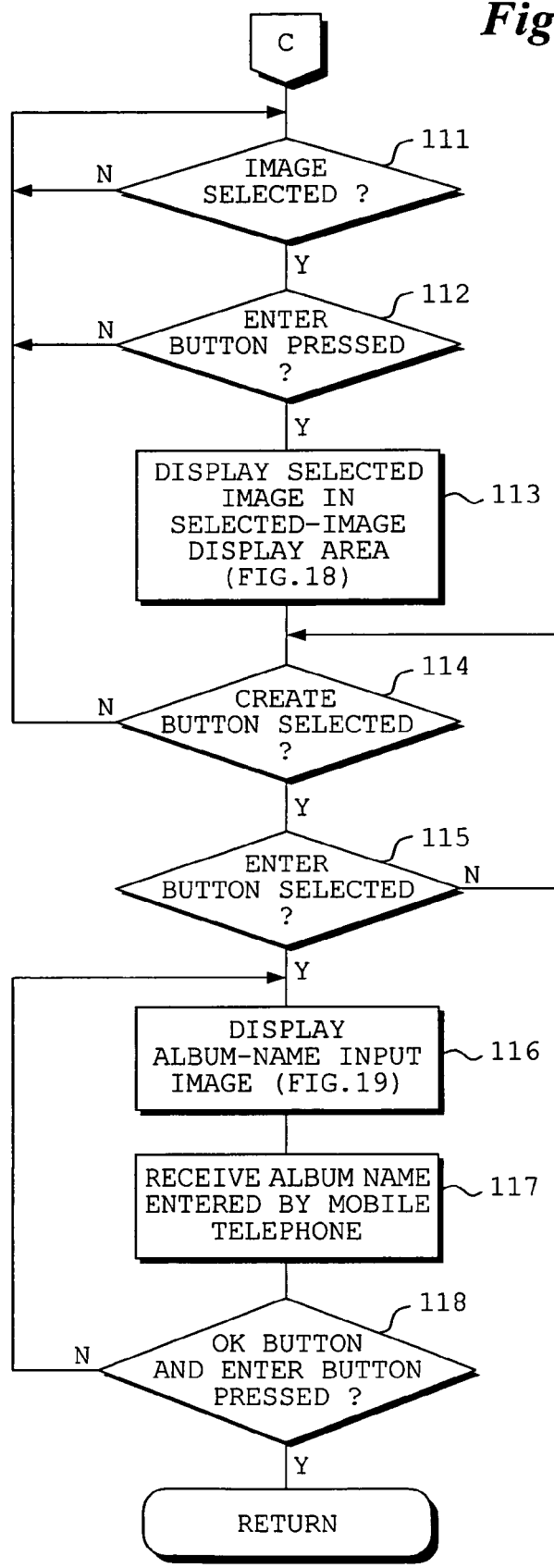

If an image is selected ("YES" at step 111) and the ENTER button 44 is pressed ("YES" at step 112) in FIG. 11 in the manner described above, then the selected image is displayed in the selected-image display area 174 (step 113).

If all new images to be stored in a new album have been selected, then the create button 175 is selected by the user through use of the mobile telephone 4 ("YES" at step 114). If the create button 175 of mobile telephone 4 is pressed ("YES" at step 115), then an album-name input image shown in FIG. 19 is displayed on the display screen 120 (step 116).

Figure 19:
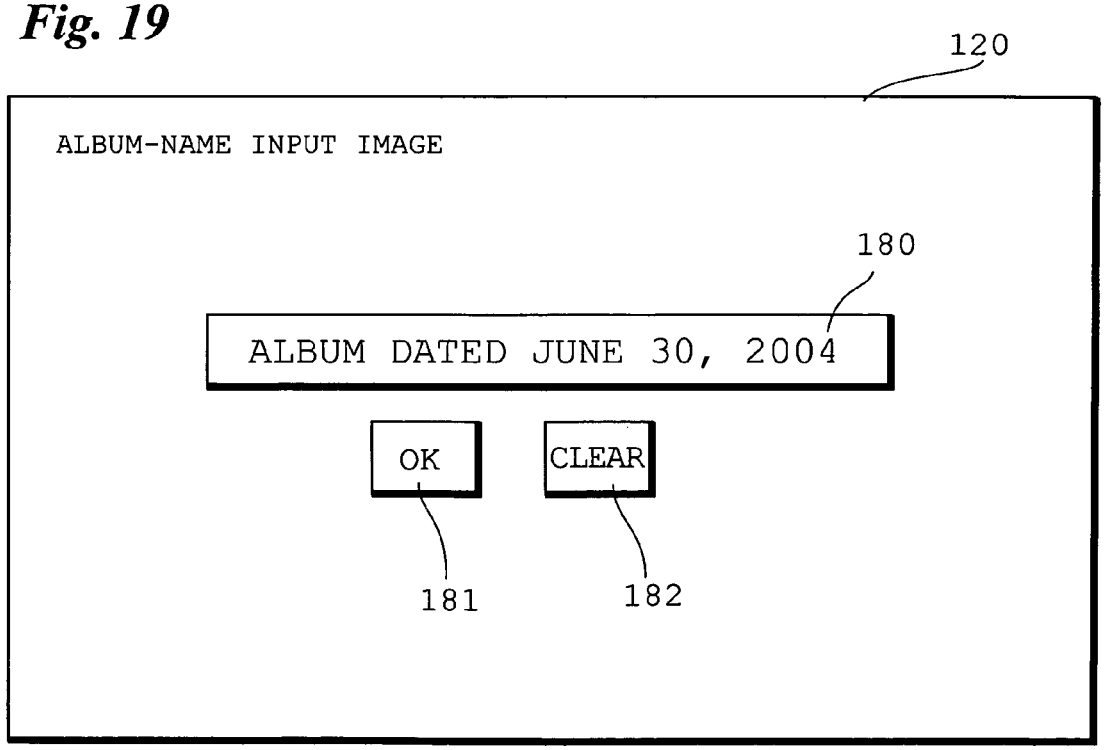

As shown in FIG. 19, an album-name display area 180 is being displayed horizontally in the album-name input image substantially at the center thereof. An OK area 81 and a clear area 182 are being displayed below the album-name display area 180. The creation date is displayed by default as the album name in the album-name display area 180. If the default album name is to be changed, the characters are input using the numeric keypad 48 of the mobile telephone 4 after the clear area 182 is selected. The data representing the entered characters is transmitted from the mobile telephone 4 to the image archiving apparatus 1. In response to this data being received by the image archiving apparatus 1 (step 117), the entered characters are displayed in the album-name display area 180 as the album name. If the OK button 181 is selected and the ENTER button 44 pressed using the mobile telephone 4 ("YES" at step 118), creation of the album is completed. Thus, a new album is constructed from desired images and has the desired album name.

Figure 20:
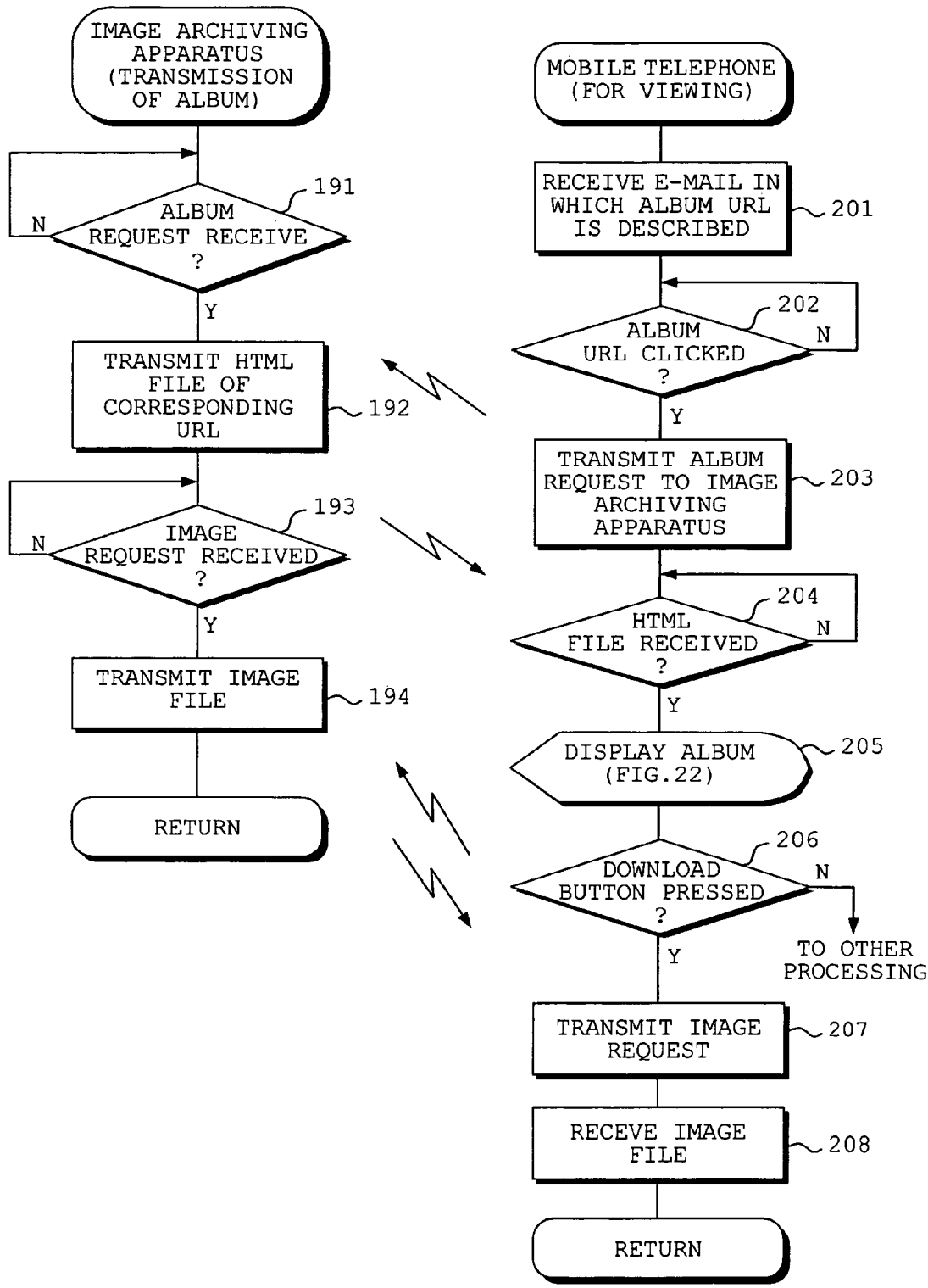
FIG. 20 is a flowchart illustrating processing executed by the image archiving apparatus and by a mobile telephone for viewing according to another embodiment of the present invention.
Figure 21:
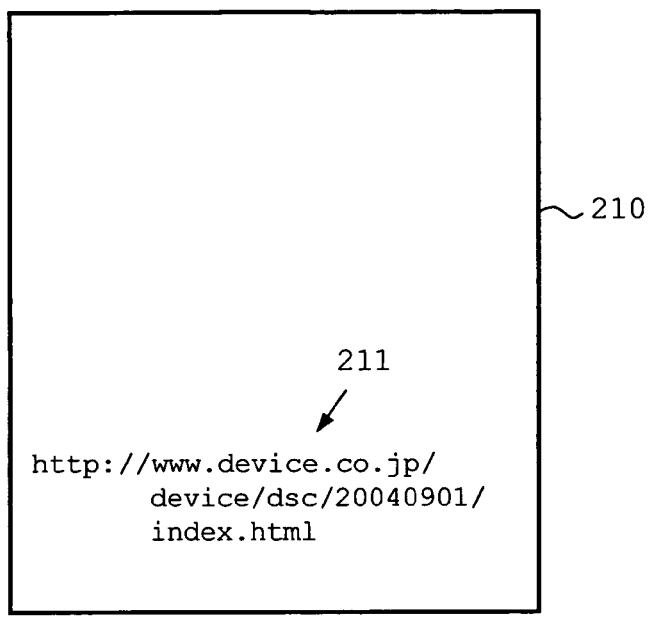
FIGS. 21 and 22 are examples of images displayed on the mobile telephone for viewing according to this embodiment.
Figure 22:
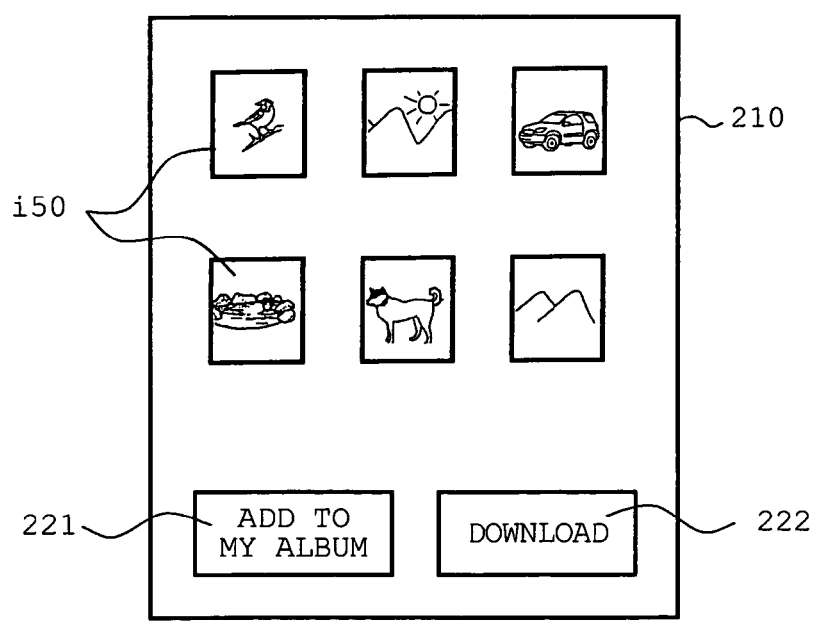

FIGS. 20 to 22 illustrate another embodiment of the present invention. This embodiment sends the viewing mobile telephone 5 a web page of an image constituting an album in response to a request from the mobile telephone 5.

FIG. 20 is a flowchart illustrating processing executed between the image archiving apparatus 1 and viewing mobile telephone 5.

As mentioned above, e-mail the main body of which describes an URL contained in an HTML file representing an album is transmitted from the mobile telephone 4 of the user of image archiving apparatus 1 to the viewing mobile telephone 5. The e-mail is received by the viewing mobile telephone 5 (step 201).

FIG. 21 illustrates a display screen 210 of the mobile telephone 5 that is displaying the main body of e-mail that has been received by the viewing mobile telephone 5. An URL 211 described in the main body of this e-mail is being displayed as a clickable area. The mobile telephone 5 also includes an up, down, left, right button and an ENTER button and the URL can be clicked using these buttons.

With reference again to FIG. 20, when the URL set forth in the main body of the e-mail is clicked by the user of the viewing mobile telephone 5 ("YES" at step 202), a request for the album represented by the HTML file that has been stored in the area specified by the URL is transmitted from the viewing mobile telephone 5 to the image archiving apparatus 1 (step 203).

When the album request transmitted from the viewing mobile telephone 5 is received by the image archiving apparatus 1 ("YES" at step 191), the HTML file corresponding to the album request is read. The read HTML file is transmitted from the image archiving apparatus 1 to the viewing mobile telephone 5 (step 192).

When the HTML file that has been transmitted from the image archiving apparatus 1 is received by the mobile telephone 5 ("YES" at step 204), the album (web page) represented by this HTML file is displayed on the display screen 210 of the mobile telephone 5 (step 205), as illustrated in FIG. 22.

As shown in FIG. 22, images (thumbnail images) i50 represented by image files supplied from the digital still camera 2 in the manner described above are displayed on the display screen 210. Further, a button 221 indicating "ADD TO MY ALBUM" and a button 222 indicating "DOWNLOAD" are displayed at the bottom of the display screen 210. The button 221 is clicked by the user when the web-page URL of the album being displayed on the display screen 210 is to be registered in the viewing mobile telephone 5. The button 222 is clicked by the user when image files representing the source images of the thumbnail images i50 constituting the album being displayed on the display screen 210 or image files suited to the display of the mobile telephone 5 are to be downloaded. It goes without saying that if image files suited to the display of the mobile telephone 5 are to be downloaded, the model information of the mobile telephone 5 is applied to the image archiving apparatus 1 and the image files are converted (in terms of size, format, etc.) based upon the model information.

With reference again to FIG. 20, if the download button 22 is clicked by the user of the mobile telephone 5 ("YES" at step 206), then an image request is transmitted to the image archiving apparatus 1 (step 207).

When the image request that has been transmitted from the mobile telephone 5 is received by the image archiving apparatus 1 ("YES" at step 193), all image files contained in the album are transmitted to the mobile telephone 5 in response to the request (step 194). Of course, only a specific image in the album can be designated. If such a designation has been made, the image file representing the designated image is transmitted from the image archiving apparatus 1 to the mobile telephone 5.

When image files that have been transmitted from the image archiving apparatus 1 are received by the mobile telephone 5 (step 208), the images represented by these image files are displayed as single frames on the entire screen of the display screen 210.

In the embodiment described above, the image archiving apparatus 1 archives image files that have been supplied from the digital still camera 2. However, image files may be supplied to the image archiving apparatus 1 even from devices other than the digital still camera 2. For example, an image file may be applied via the CD-ROM drive or via the Internet. Further, viewing may be performed using the personal computer 6 and not just a mobile telephone.

As many apparently widely different embodiments of the present invention can be made without departing from the spirit and scope thereof, it is to be understood that the invention is not limited to the specific embodiments thereof except as defined in the appended claims.

What is claimed is:

1. An image archiving apparatus comprising:
   an image data input device for inputting image data supplied from an external image data storage device;
   a discriminating device for discriminating the model of the external said image data storage device; and
   an image data storage device for storing image data, which has been input from said image data input device, group by group, wherein the group is based upon the model that has been discriminated by said discriminating device;
   a display control device for controlling an image display device in such a manner that images represented by image data contained in a group will be displayed in the form of an array group by group;
   a selecting device for selecting images from among images displayed based upon control by said display control device; and
   a first storage control device for controlling said image data storage device in such a manner that image data representing images selected by said selecting device will be stored as a new group.

2. The apparatus according to claim 1, further comprising:
   a selecting device for selecting one group from among groups into which image data that has been stored in said image data storage device has been divided; and
   a display control device for controlling an image display device in such a manner that images represented by image data contained in a group that has been selected by said selecting device will be displayed in order.

3. The apparatus according to claim 2, wherein said selecting device has an infrared receiving device for receiving a selection command transmitted by infrared communication from a mobile telephone;
   said one group being selected based upon the selection command received by said infrared receiving device.

4. The apparatus according to claim 1, further comprising:
   a group name input device for inputting a group name of image data that has been stored by said storage control device; and
   a second storage control device for controlling said image data storage device in such a manner that data representing a group name that has been input by said group name input device will be stored in association with a new group corresponding to image data stored under the control of said storage control device.

5. The apparatus according to claim 4, wherein said group name input device includes an infrared receiving device for receiving group-name data transmitted from a mobile telephone;
   a group name represented by group-name data received by said infrared receiving device being input.

6. The apparatus according to claim 1, further comprising:
   an album page generating device for generating data representing an album page that contains images represented by image data that has been stored group by group in said image data storage device;
   a display control device for controlling said image data storage device in such a manner that album page data that has been generated by said album page generating device will be stored at a prescribed address;
   a receiving device for receiving data representing a request to the address; and
   an album page data transmitting device for transmitting the album page data, which has been stored in said image data storage device at the address, to an apparatus that is the source of the request, in response to reception of the request data by said receiving device.

7. An image archiving apparatus comprising:
   an image data input device for inputting image data supplied from an external image data storage device;
   a photography date detecting device for detecting date of photography of an image represented by image data that has been input to the image data input device; and
   an image data storage device for storing image data, which has been input to the image data input device, group by group,
   wherein the group is based upon the date of photography that has been detected by said photography date detecting device, and
   wherein the image storing device further stores a Uniform Resource Locator identifying a web page where the image group may be viewed;
   the apparatus further comprising:
   a selecting device for selecting one group from among groups into which image data that has been stored in said image data storage device has been divided; and
   a display control device for controlling an image display device in such a manner that images represented by image data contained in a group that has been selected by said selecting device will be displayed in order.

8. A method of controlling an image archiving apparatus, comprising the steps of:
   inputting image data supplied from an external image data storage device;
   discriminating the model of the external image data storage device; and storing the input image data group by group, wherein the group is based upon the model that has been discriminated;

controlling an image display device in such a manner that images represented by image data contained in a group will be displayed in the form of an array group by group;

selecting images from among images displayed based upon control by said display control device; and controlling said image data storage device in such a manner that image data representing images selected by said selecting device will be stored as a new group.

9. A method of controlling an image archiving apparatus, comprising the steps of:

inputting image data supplied from an image data storage device;

detecting date of photography of an image represented by image data that has been input;

storing the input image data group by group, wherein the group is based upon the date of photography that has been detected and further storing a Uniform Resource Locator identifying a web page where the image group may be viewed;

selecting one group from among groups into which image data that has been stored in said image data storage device has been divided; and controlling an image display device in such a manner that images represented by image data contained in a group that has been selected by said selecting device will be displayed in order.

* * * * *